United States Patent [19]

Andrews

[11] Patent Number: 4,810,682

[45] Date of Patent: Mar. 7, 1989

[54] PRODUCTION OF USEFUL MATERIALS INCLUDING SYNTHETIC NEPHELINE FROM BAYER RED MUD

[75] Inventor: William H. Andrews, Mount Waverley, Australia

[73] Assignee: Comalco Aluminum Limited, Melbourne, Australia

[21] Appl. No.: 60,172

[22] Filed: Jun. 10, 1987

[30] Foreign Application Priority Data

Jun. 26, 1986 [AU] Australia .................... PH6579

[51] Int. Cl.$^4$ ............................................. C04B 33/04
[52] U.S. Cl. ..................................... 501/146; 501/145; 423/82; 423/119
[58] Field of Search ................ 501/147, 146; 423/119, 423/82

[56] References Cited

U.S. PATENT DOCUMENTS

| | | | |
|---|---|---|---|
| 3,311,449 | 3/1967 | Atsukawa | 423/82 |
| 4,017,425 | 4/1977 | Shiao | 502/408 X |
| 4,668,485 | 5/1987 | Cresswell | 423/119 |

OTHER PUBLICATIONS

Chemical Abstracts, vol. 73 (Nov. 16, 1979), 106–107, No. 100566q (Japanese Patent Appln. JP-A-7025762 Yo Kosh), "Recovery of Useful Materials from Red Muds in Alumina Manufacturing Process".

Chemical Abstracts, vol. 80 (Mar. 11, 1974), 113 No. 49861x (Japanese Patent Appln. 7375497 Sumitomo Chemical Co. Ltd.), "Readily Soluble Aluminium Hydroxide".

Chemical Abstracts, vol. 82 (Mar. 24, 1975), 124 No. 75093j (Japanese Patent Appln. 7425118 Sumitomo Chemical Co. Ltd.), "Recovering Valuable Components of Red Mud".

*Primary Examiner*—William R. Dixon, Jr.
*Assistant Examiner*—James M. Hunter, Jr.
*Attorney, Agent, or Firm*—Larson and Taylor

[57] ABSTRACT

A process for production of useful materials including a product of similar composition to nepheline involves contacting a slurry of red mud with sulphur dioxide to dissolve components of the red mud that are soluble in sulphurous acid, removing residual undissolved solids by filtration, and recovering a filtrate containing soda, alumina and silica values, removing free water from the filtrate to produce a crystallized residue, and calcining the crystallized residue.

12 Claims, No Drawings

PRODUCTION OF USEFUL MATERIALS INCLUDING SYNTHETIC NEPHELINE FROM BAYER RED MUD

This invention relates to production of useful materials, including a material of composition similar to nepheline, from Bayer plant red mud.

Other possible products include sodium sulphate, hauynite ($3Na\ Al\ SiO_4.CaSO_4$) and a fine white powder of indeterminate mineralogy having potential as a filler.

The natural mineral nepheline (also known as nephelite) is a sodium potassium aluminium silicate, as will be discussed in more detail below.

The natural ore, nepheline syenite, used in the glass and ceramic industries as a flux and vitrifying agent, as well as in other industries, contains a relatively high proportion of the mineral.

The principal product of the present invention is useful for the same purposes as natural nepheline and in certain instances exhibits significant advantages over natural nepheline.

The term "red mud" is used in the aluminium industry to describe the by-product resulting from the digestion of bauxite with caustic soda. The process is named after its inventor, Bayer, and it depends upon the selective solubility of alumina in caustic soda under operating conditions appropriate to the particular bauxite being processed. Red mud not only carries the components of bauxite which are insoluble in caustic soda such as iron oxide and titanium dioxide but also a compound known in the industry as desilication product. Chemically this is hydrated sodium aluminium silicate, approximating to the natural mineral cancrinite. A common chemical formula assigned to this material is $3Na_2O\cdot 3Al_2)_3.5SiO_2.5H_2.Na_2CO_3$. Universal agreement on a composition for this compound does not exist and a number of formulae are quoted by different authorities in which the proportions of soda, alumina, silica and water vary. In addition, depending upon the particular alumina plant circuit conditions, the sodium carbonate molecule attached to the cancrinite may be substituted to varying degrees by sodium chloride, sodium sulphate or sodium aluminate.

Desilication product plays a critical role in the Bayer plant process since it provides the mechanism for the removal of silica taken into solution during digestion by caustic soda. All bauxites without exception contain silica in one or more forms and in particular the mineral kaolin (hydrated aluminium silicate) is readily soluble in caustic soda. The dissolved silica cannot be allowed to contaminate the alumina, which is the final product from the Bayer plant, in anything other than trace amounts, and therefore, it is critical to remove the silica before the alumina is precipitated in the hydrated form. Fortunately the desilication compound is very insoluble in caustic solutions and Bayer plant circuits are operated in a manner conducive to precipitation of silica in this particular form.

Separation of the red mud from the liquid containing the dissolved alumina is achieved by flocculation, settling, decantation and filtration. The red mud is washed to recover as much of the associated dissolved sodium aluminate as possible and it is then normal to dispose of the red mud in a manner which causes minimum environmental problems. It should be noted that at this stage the red mud will also contain a number of other components in minor quantities. For example, it is normal to introduce lime into certain parts of the alumina plant operation and this material will report in the red mud in the form of compounds such as calcium aluminate, calcium phosphate and calcium oxalate. One of the major problems associated with the disposal of the red mud is the fact that it is difficult to wash the mud thoroughly and therefore the final mud normally contains residual sodium aluminate and thus the liquor associated with the red mud solids may be strongly alkaline. THe amount of liquor associated with the red mud will depend on the processing used before it leaves the alumina plant. If the final stage of processing is in wash thickeners the slurry may contain as much as 80% liquor when it is pumped to the selected storage site. Alternatively, if filtration is used, a much lower liquor content will result and the disposed product may contain less than 50% liquor.

The presence of caustic-containing liquor is perhaps the most serious problem associated with the disposal of red mud. Potential exists for pollution of ground waters by drainage from red mud dams and even disposal of the red mud slurry at sea may be prohibited by local authorities. In addition, the red mud will normally contain a very high proportion of fine particles ranging from down to sub-micron sizes and such material presents a difficult handling problem until a high proportion of the water has been removed.

Many attempts have been made throughout the twentieth century to utilize red mud. The desilication product previously referred to contains soda and alumina, both of which are valuable commodities to an alumina plant, and the loss of caustic soda through the formation of the compound is a major cost factor in the operation of such plant. Numerous attempts have been made to develop technologies which will allow recovery of one or both of these components and in particular processing at elevated temperature in the presence of lime (the lime-soda-sinter process) has been practised to a limited extent in order to recover the soda and alumina at the expense of usage of lime. Normally this procedure has been found to be not economically viable. Those associated with the operation of alumina plants will be away of a number of other technologies which have been investigated as possible routes to recover the soda and/or alumina content.

In addition, it is well known that the red mud contains potentially valuable materials such as iron oxide and titanium dioxide as well as some trace elements, the concentrations of which would depend upon the particular bauxite selected as feed to the alumina plant. No physical processing has yet been demonstrated as being capable of separating any of these components in concentrations which are of economic interests, nor have various pyrometallurgical processes proven to be economically viable as a way of using red mud in the quantities generated.

The potential of using red mud as a building material has been considered alone or by blending with other forms of building material which happen to be available locally such as sand, clays, or marls. Again this has been found to be economically justifiable only in exceptional circumstances.

By far the commonest method of disposal of red mud is to place it in dams and allow these dams to de-water naturally by drainage and evaporation, following which soil may be spread across the dam and selected vegetation planted on the material.

The magnitude of the problem can be better understood when it is realised that at the present time the annual western world production of alumina is about 27 million tonnes. The amount of red mud produced per tonne of alumina will vary according to the particular bauxite being processed, but typically a tonne of alumina will produce as a by-product 0.5 to 2.0 tonnes of red mud. Furthermore, in a single location, an alumina plant may be producing 2.5 million tonnes or more of alumina per annum so the amount of red mud produced in that particular environment can be very large.

It will be apparent from the foregoing that a substantial amount of the problem associated with red mud relates to the presence of residual caustic soda, very fine particle sizing and the precipitated desilication product. The desilication product interferes with the recovery of other possibly valuable components of the mud, as well as contributing substantially to the total mass of the mud. The current situation can be summarized by saying that economic processing of the red mud produced from Bayer plants has proven to ben an intractable problem and efforts have concentrated on efficient disposal of the mud at minimum cost.

The present invention relates to a processing treatment for the red mud slurry which recovers not only the soda and alumina, but also the silica present as desilication product, in the form of useful products. The removal of sodium aluminum silicate from the mud is also accompanied by the recovery of soda and alumina present in the associated red mud liquor. Other forms of alumina may be subsequently recovered and become available for incorporation in compounds of soda, alumina and silica. The quantity of red mud solids is directly reduced and this enhances the concentration of other potentially valuable constituents such as iron or titanium oxide. At the same time, processes to separate and recover these components by chemical or physical means are simplified by the removal of the desilication product. The latter contains elements which are undesirable in the chemical processing for the recovery of iron and titanium oxides. Also, because it is a finely-divided precipitate, the presence of desilication product complicates physical separation processes which depend upon the liberation of component minerals and freedom from contamination of the mineral surfaces.

Even if recovery of components such as iron or titanium oxides is not required, the mud generated in the process of this invention is relatively benign and its disposal is easier.

It has been known for many years that desilication product is selectively soluble in sulphurous acid. The use of sulphur dioxide in gaseous form bubbled into a slurry of red mud results in the sodium aluminium silicate being dissolved and substantially quantitative solution of the compound is achievable. The technology has been used as an analytical tool for the analysis of red muds. Attempts have also been made to use the technology for the recovery of soda and alumina for red mud. A major associated difficulty is the fact that not only does the soda and alumina go into solution, but the silica also passes into solution, probably in the form of a silicic acid. From the point of view of a Bayer plant it is essential to separate this silica before recovering the soda and/or alumina. The difficulties associated with the separation have been such that no known utilization of the process is in operation. The present invention takes advantage of the selective solubility of the desilication product in a solution of sulphurous acid and also recognises that residual soda and alumina in solution will be recoverable. The solution resulting from digestion with sulphur dioxide is believed to contain sodium in the form of the sulphite, but the form of the alumina and silica is yet to be resolved. It is probable that these constituents are present in the gel or colloidal form but for the purposes of the present invention, this is of no significance since both constituents report to the liquor phase and act essentially as solutes. By filtration it is possible to remove the residual undissolved solids which will represent a further concentration of component such as iron oxide and titanium dioxide, the advantage of which has previously been discussed, and to obtain a solution which will carry substantially all of the soda, alumina and silica contained in the original desilication compound and the caustic liquor. Forms of silica such as quartz will remain in the insoluble form.

BRIEF SUMMARY OF THE INVENTION

In accordance with the invention a process for the recovery of Bayer red mud to produce useful materials therefrom comprises:

(a) contacting a slurry of red mud with sulphur dioxide to dissolve components of the red mud that are soluble to sulphurous acid, (b) removing residual undissolved solids by filtration, and recovering a filtrate containing soda, alumina and silica values, (c) removing free water from the filtrate to produce a residue, and (d) calcining the residue to produce at least one useful material as product.

DETAILED DESCRIPTION OF PREFERRED EMBODIMENTS

It has been recognised in this invention that the stoichiometry of the soda, alumina and silica contained in the filtrate is not dissimilar to that of the natural mineral nepheline (also known as nephelite). This mineral is a very common naturally occurring material found in basic rocks which are deficient in silica. As it naturally occurs, this mineral is a sodium potassium aluminium silicate corresponding typically to the composition $Na_3K(Al_4Si_4O_{16})$. In the pure soda form which does not occur commonly in nature, this can be regarded as $Na_2O.Al_2O_3.2SiO_2$. A compound of that formula would contain, theoretically, 35.9% $Al_2O_3$, 21.8% $Na_2O$ and 42.3% $SiO_2$. The mineral frequently occurs associated with feldspars and is mined and sold in the concentrated form as nepheline syenite, having a typical composition of 23–24% $Al_2O_3$, 8–10% $Na_2O$, 5–8% $K_2O$, and 56–60% $SiO_2$, 0.1–0.3% CaO. This material is sold to the glass and ceramic industries as a flux and vitrifying agent. In the finely ground form, it has application as a filler. It is also used in the U.S.S.R. as a raw material for the production of alumina, soda, potash and cement. In the western world it is produced only in Norway and Canada. It is sold in competition with feldspars for the uses described above, namely glass, ceramics and fillers. Felspars contain lower contents of alumina and alkali and a higher content of silica with a typical analysis being 14–22% $Al_2O_3$, 1–10% $Na_2O$, 8–15% $K_2O$, 65–75% $SiO_2$, 0.2–6% CaO.

It will be seen from the above analyses that the theoretical soda-rich nepheline compound contains more alumina and alkali than either of the other two materials. Such an increase in the alkali and alumina content is economically important since nepheline syenite and feldspar are used in the glass and ceramic industries as a source of these compounds. In the glass industry, for example, nepheline syenite is added as a source of alumina, rather than using high purity metallurgical grade alumina. At the same time, the high alkali content replaced part of the sodium carbonate which would otherwise be required. The third major component, namely silica, replaces part of the high quality silica sand which would be required in glass making. In ceramics, nepheline syenite is an important flux because of its alkali and alumina content. It will be shown that by this invention it is possible to make a product which is advantageous with respect to alkali and alumina content.

It has already been noted that calcium is a normal constituent of red mud, whether it be derived from the original bauxite or from the additions of lime normally made in the Bayer process. This element is also important in the invention under discussion, since it is found that in the sulphur dioxide digestion, a high proportion of the calcium may be dissolved, and become part of the filtrate liquor. The presence of calcium is not detrimental particularly as a raw material for the glass industry where substantial amounts of calcium are a normal constituent of the end product. Where calcium is a significant component of the solution, the dominance of nepheline in the end product may be depleted by conversion to hauynite, a mineral compound having a formula $3Na\, Al\, SiO_4.CaSO_4$. More generally, the actual composition of the final product regarded in this invention as nepheline may be considered as a sulpho-silicate of sodium, aluminium and calcium, with the actual compounds present being finally determined by the stoichiometry of the original red mud and the process conditions applied.

This invention therefore recognises that the liquor phase after digestion by sulphurous acid will contain the compounds of soda, alumina and silica approximately in the stoichiometric compositions which are found in soda-nephelite. Thus by evaporation to remove free water and calcination of the residue, it is possible to produce a material approximating to the composition of soda nepheline while at the same time releasing oxides of sulphur. The procedure avoids the need to try and separate the soda, alumina or silica found in the solution phase since all three compounds enter into the valuable end-product, typically a synthetic form of high-soda nepheline or similar compound.

The chemistry of the solution resulting from treatment of the red mud by sulphur dioxide is known to be complex and unstable. Heating below boiling point initiates at least partial precipitation of the silica, and furthermore, aluminum present in solution of sulphurous acid can precipitate as a range of hydrated gels or basic sulphites depending upon conditions prevailing. These factors inhibit separation of the components. However, the present invention does not purport to make any such separation, rather the intention is to retain the soda, alumina and silica in the solid end-product in the same stoichiometric proportions as that achieved by the solution stage. This is achieved by controlled evaporation to remove the solvent (i.e., water) in one or more stages. Desirably the final stage will be carried out in a spray-drier or nozzle drier to produce a homogeneous, free-flowing powder or pellet containing sodium sulphites and alumina gels, sulphites or basic sulphite, silica and water of hydration. Variable amounts of calcium sulphite will also be present.

Subsequent thermal processing of this solid phase at elevated temperatures either in the powder form or after agglomeration causes release of oxides of sulphur and water of hydration. The product of such processing or roasting will then contain the soda, lime, alumina and silica taken from the red mud in an added value form suitable for use in the glass or ceramic industries after grinding to appropriate particle size distributions.

The calcination of the dried powder is necessary to produce a material similar to the mineral nepheline. The phases through which the mixture passes will vary according to whether the thermal processing is carried out in an inert/reducing or an oxidising atmosphere. Thus, the mineralogy of the product is determined by the temperature of calcination.

Experimental studies using thermogravimetric and differential thermal analysis techniques suggest that in an inert atmosphere a typical sample of the dried powder undergoes the following changes:

| Temperature (°C.) | % Wt. Loss | Interpretation |
| --- | --- | --- |
| Below 150 | 9 | Dehydration of silica |
| Between 150 and 350 | 18 | Dehydration of basic aluminium sulphite or alumina gel |
| Between 500 and 750 | 5 | Reaction of silica with basic aluminium sulphite to yield mullite and sulphur dioxide |
| Between 860 and 950 | 3 | Reaction between mullite and sodium sulphite to yield nepheline or Hauynite |
| Between 1200 and 1300 | | Sintering |

All reactions were observed to be endothermic.

In an oxidising atmosphere, the above behaviour altered, particularly in the temperature range from 250° to 700° C. when a strongly exothermic reaction occurred associated with the conversion of sulphites to sulphates through oxidation.

In consequence, the end product was a mixture of nepheline or hauynite and sodium sulphate, and oxides of sulphur were released.

Two alternatives are thus possible: 1. Calcination in an inert/reducing atmosphere to yield sulphur dioxide for recycle to the red mud digestion step and production of nepheline and/or hauynite. 2. Calcination in an oxidising atmosphere to yield sulphur in the vapour phase primarily as oxides, and production of nepheline and/or hauynite and sodium sulphate. The sulphurous gases resulting from this route may not be suitable for direct recycling but are available for conversion to sulphuric acid or other selected end uses.

The compositions of the final products will depend on the proportions of various elements present, and in particular, of sodium, aluminium, calcium and silica. Adjustment of these proportions can be made to increase or decrease the proportions of different phases in the end product. In the same way control of the conditions of red mud digestion enables the stoichiometry of the solution to be altered. In particular, sodium is more readily dissolved than alumina or silica.

Furthermore, it has been shown that water leaching of the product resulting from an oxidising calcination at 1000°–1200° C. permits the solution of sodium sulphate, which after separation by filtration can be crystalised, to form high purity thenardite, the anhydrous low-temperature form of sodium sulphate. The residue is a fine white powder depleted in sodium content, but with enhanced contents of aluminium, calcium and silica. This product retains its usefulness to the glass industry because of its high alumina content, while all of the other constituents are also desirable in glass production (sodium, silica, calcium, sulphate). Unexpectedly, the same fine white powder demonstrates properties which are frequently sought in a filler for the plastic and other industries. In particular, it was found to naturally contain a very high level of particles finer than 10 micrometers. The particles are generally equiaxial, but there is also a proportion of fibres. Brightness exceeded 80% on the I.S.O. scale.

The red much residue from the sulphurous acid digest may contain iron oxide, titanium dioxide, residual boehmite or gibbsite formed by auto-precipitation during the Bayer process, undecomposed bauxite, quartz and a number of trace elements, depending upon the original bauxite used in the process. With the removal of the desilication product, it becomes possible to consider the recovery of other components. Even if no other components are recovered for commercial use, the residual red mud will have a substantially reduced volume and will be free of the caustic content which causes high alkalinity. As such it is much more innocuous and the problem of disposal is substantially reduced.

The appropriate procedure to treat residual red mud will depend upon the actual composition, but a number of courses of action are within the scope of the present invention. One way is to treat the red mud with caustic soda to dissolve residual hydrated alumina. If the process is operated in association with the Bayer plant, the resultant sodium aluminate liquor can be fed to that circuit at an appropriate point, thus increasing the efficiency of recovery of alumina from the original bauxite. Alternatively, the sodium aluminate solution resulting can be mixed with the filtrate from the sulphur dioxide process thus increasing the soda and alkali content of the final sodium aluminium silicate product. This route will also minimise any tendency for sulphur dioxide to be lost from the liquor during the evaporation stage because of the higher pH environment.

Removal of the residual free alumina in the above manner not only provides a source of alumina but also concentrates and further purifies the remaining constituents after solid-liquid separation by filtration or other appropriate step, such as washing. Depending upon the particular bauxite used and the characteristics of the residue at this point, it may be possible for example to use mineral dressing techniques such as classification, flotation, selective flocculation or magnetic separation to effect a separation between the iron oxide and titanium dioxide. If these steps are not technically feasible in a specific case, a further alternative is to consider the digestion of the cake in 20% hydrochloric acid at elevated temperatures which gives a high degree of selectivity in the solution of iron oxide. This iron oxide would pass into solution as ferric chloride, possibly requiring an oxidation step to complete conversion from the ferrous to the ferric state. Hydrolysis of the liquor at elevated temperature can be used to recover iron oxide in powder or pellet form, while regenerating hydrochloric acid for recycle. The residue from this digestion will have a very high content of titanium dioxide and this compound may be directly suitable for use in the production of titanium dioxide pigment by the sulphate or chloride process, depending upon the residual impurities still present. It is to be expected that at this point some chemically refractory materials such as zircon or traces of precious metals will be concentrated in this particular phase. The potential to recover trace elements will depend upon the particular element, and where it reports in the process streams, as well as its degree of concentration.

A further alternative of treat the residue of digestion which is rich in oxides of iron and titanium is to use an electric smelting process to generate a pig iron and a titanium slag, in accordance with established technology.

As a further refinement of this invention, it may be desirable to carry out a size separation of the red mud by classification of the slurry at an appropriate point in the circuit.

For example, even before carrying out the sulphurous acid digest, it may be preferable to separate at a particle size of 10 micrometers or less using available technology to produce a coarse fraction as a separate stream. This coarse fraction, because it can be subjected to thorough washing to remove caustic, and because any desilication product will be present in a coarse form, is easily disposed of in a safe manner. At the same time, constituents such as quartz, undecomposed bauxite or plant scale which may interfere with the processing or purity of the subsequent products can be removed. Alternatively, such a separation could be carried out after the sulphurous acid digest if it is economically desirable to recover all of the soda contained in the red mud. It will be obvious to those experienced in the art that a number of variations of this type can be exercised in the application of the invention without affecting the novel concept of recovering from red mud a valuable by-product, namely synthetic nepheline, while at the same time removing components which cause substantial problems in the disposal of the red mud. Possibilities for the recovery of other valuable components from what is normally a waste material are also opened up.

At the same time, the ability to produce a very fine iron-rich material free from deleterious chemicals such as caustic soda suggests a possibility of pigment manufacture.

The economics of the process of the claimed invention may benefit substantially from the fact that the reagent required to treat the red mud, namely sulphur dioxide, can be readily regenerated by calcination in an inert atmosphere of the solid fraction obtained by evaporation of the soluble phase after digestion. Apart from requiring make up sulphur dioxide which would normally be produced by burning elemental sulphur or a sulphide compound, the only major consumable in such a process then become fuel for evaporation and calcination. Depending upon the particular circuit it may well be possible to use very high sulphur fuel oil, particularly if the exhaust gases from combustion form part of the gas stream with which the red mud slurry filtrate liquor is treated. It will also be recognized by those experienced in these technologies that limited quantities of red mud are already used as a de-sulphurising agent for the treatment of sulphur-containing gases.

As an example of the invention, processing of a typical red mud produced from Weipa bauxite is described in Example I. In this particular material, the desilication product is believed to contain very little chloride or sulphate and these components are not discussed in this example. It is recognised that some calcium will be taken into solution during the sulphurous acid digestion.

These three impurities are of minor significance for the following reasons. Calcium oxide is an alkali and is a common impurity in nepheline syenite or feldspars used in the industries described. It is also a common constituent of glass. It is not detrimental to the end use and because it is an alkali it is effective in assisting the fluxing and vitrifying actions required. Compounds containing sulphate ion such as salt cake, sodium sulphate, are regularly added to glass and the introduction of small qualtities from the synthetic nepheline will have not effect. Similarly, the chloride ion is a common impurity in the soda ash used in the manufacture of glass and small amounts are of no significance in its end use. Providing the solid-liquid separation after sulphurous acid digestion is carried out in a properly controlled manner, the iron oxide content of the synthetic nepheline will be very low and should be lower than that normally found in commercial deposits of nepheline syenite.

Depending on the particular red mud being processed there is a possibility of producing a synthetic nepheline which will have a better chemical composition from the point of view of end use in the glass and ceramic industries than products now in use. For example, Example I shows that it would be possible to produce a material containing about 51% alkalies plus alumina by comparison with the typical level of 30–40% contained in the commercial materials such as feldspars and nepheline syenite. A substantial premium should thus be achieved from the scale of synthetic nepheline. Furthermore, the purity of the end-product will enhance the value of the material for use as a filler.

EXAMPLE I

A sample of red mud produced by caustic soda digestion of a sample of Weipa bauxite was found to have the following analysis:

| | |
|---|---|
| $Na_2$ | 8.7% |
| $Al_2O_3$ | 22.9% |
| $SiO_2$ | 16.2% |
| CaO | 1.8% |
| $Fe_2O_3$ | 34.5% |
| $TiO_2$ | 8.4% |
| L.O.I. | 7.2% |

From a knowledge of the constituent minerals, it was possible to calculate the mineralogical composition to be approximately:

| | |
|---|---|
| Desilication Product | 41.8% |
| Quartz | 2.2% |
| Hematite | 34.5% |
| Anatase/Rutile | 8.4% |
| Gibbsite & Boehmite | 11.0% |

Portion of the mud in the form of a slurry containing 10% solids was treated at a temperature of 30° C. by bubbling a steam of sulphur dioxide through the slurry for a period of 10 minutes. The slurry was then removed from the gas stream and filtered with washing to remove dissolved salts. The residue was dried, weighed and analysed with the following results:

| | | |
|---|---|---|
| Residue | % wt | 55.3% of original |
| % Extraction | $Na_2O$ | 98.9 |
| | $Al_2O_3$ | 58.7 |
| | $SiO_2$ | 83.2 |
| | CaO | 81.0 |

Complete solution of the sodium aluminium silicate phase (DSP) would theoretically have given the following result:

| | | |
|---|---|---|
| Residue | % wt | 58.2% of original |
| % Extraction | $Na_2O$ | 100.0 |
| | $Al_2O_3$ | 62.4 |
| | $SiO_2$ | 86.4 |

It will readily be seen that when allowance is made for the behaviour of calcium compounds and other minor constituents the actual and theoretical results correlate very closely.

The filtrate was evaporated and the dry solid calcined at 1000° C. The calcined residue was analysed.

The composition expressed in percentage terms in given in the following table. Analyses of pure nepheline, pure hauynite, nepheline syenite and typical feldspars are included for comparison.

| | Synthetic Nepheline | Stoichiometric Nepheline | Stoichiometric Hauynite (Example 1) | Nepheline Syenite | Feldspars |
|---|---|---|---|---|---|
| % $Na_2O$ | 20.0 | 21.8 | 16.6 | 8–10 | 1–10 |
| % $Al_2O_3$ | 27.0 | 35.9 | 27.2 | 23–24 | 14–22 |
| % $SiO_2$ | 28.1 | 42.3 | 32.0 | 56–60 | 65–75 |
| % CaO | 4.0 | — | 10.0 | 0.1–0.3 | 0.2–6 |
| % $K_2O$ | — | — | — | 5–8 | 8–15 |
| $SO_3$ | 16.1 | — | 14.2 | — | — |
| LOI | 4.8 | — | — | — | — |
| Total alkali | 24.0 | 21.8 | 26.6 | 16 | 16–18 |
| Total alkali and alumina | 51.0 | 57.7 | 53.8 | 40 | 30–40 |

The synthetic nepheline is clearly an attractive source of alkali and alumina by comparison with natural sources.

The solid residue was found to contain substantially increased concentrations of iron oxides and titanium dioxide totalling about 77% of the residue. Classifications to remove the coarse fraction would further increase this value through the removal of a coarse fraction high in quartz.

EXAMPLE II

A further sample of liquor produced by digesting red mud with sulphur dioxide was separated by filtration from the residue. The liquor was then evaporated and the residue calcined in an oxidising atmosphere at 1000° C. The calcined product was leached in hot water to dissolve the sodium sulphate present and the residue recovered by filtration and drying. The material was given a gentle milling to disperse the powder and submitted to sizing analysis by sedigraph brightness determination by I.S.O. standard methods, together with colour determinations.

| Sizing Analysis: | |
| --- | --- |
| Passing 10 micrometers | 95% by wt. |
| Passing 5 micrometers | 81% by wt. |
| Passing 2 micrometers | 40% by wt. |
| Passing 1 micrometer | 14% by wt. |
| Brightness: | |
| % I.S.O. | 81% |
| L value (whiteness) | 93.5 |
| a. colour (red-green) | 0.5 |
| b. colour (blue-yellow) | 2.6 |

This data suggests that the powder has characteristics attractive for use in filler applications of the plastics and other industries.

The solution of sodium sulphate was evaporated and the resulted crystals demonstrated to be thenardite by X-ray diffraction.

It will be clearly understood that the invention in its general aspects is not limited to the specific details referred to hereinabove.

What is claimed:

1. Process for the treatment of Bayer Red Mud to produce useful materials therefrom, said process comprising:
   (a) contacting a slurry of red mud with sulphur dioxide to dissolve components of red mud that are soluble in sulphurous acid,
   (b) removing residual undissolved solids by filtration, and recovering a filtrate containing sodium monoxide, alumina and silica values,
   (c) removing free water from the filtrate to produce a residue, and
   (d) calcining the residue to produce at least one material suitable for use in the glass or ceramic industries as a source of sodium monoxide, alumina or silica.

2. Process according to claim 1 in which sulphur dioxide is recovered from step (c) and step (d) and recycled to step (a).

3. Process according to claim 2 in which step (d) is carried out in an inert or reducing atmosphere to yield sulphur dioxide for recycle to step (a).

4. Process according to claim 1 in which step (d) is carried out in an oxidising atmosphere.

5. Process according to claim 1 in which the product contains synthetic nepheline.

6. Process according to claim 1 in which the product contains hauynite.

7. Process according to claim 1 in which step (d) is carried out in an oxidising atmosphere and the product contains sodium sulphate.

8. Process for the production of synthetic nepheline from Bayer Red Mud which comprises:
   (a) contacting a slurry of Red Mud with sulphur dioxide to dissolve components of the Red Mud that are soluble in sulphurous acid.
   (b) removing residual undissolved solids by filtration, and recovering the filtrate containing sodium monoxide, alumina and silica values,
   (c) removing free water from the filtrate to produce a residue,
   (d) calcining the residue in an inert or reducing atmosphere,
   (e) recycling sulphur dioxide yielded in step (d) to (a), and
   (f) recovering synthetic nepheline as a produce from step (d).

9. The product of a process according to claim 7, said product containing sodium sulphate and at least one composition selected from the group consisting of nepheline and hauynite, the mineralogy of the product being determined by the temperature of calcination.

10. The product of a process according to claim 1.

11. Process according to claim 1 in which sulphur dioxide is recovered from step (b) and recycled to step (a).

12. Process according to claim 1 in which sulphur dioxide is recovered from step(c) and recycled to step (a).

* * * * *